United States Patent [19]
Snowden

[11] 3,748,691
[45] July 31, 1973

[54] VAPORIZING APPARATUS FOR TREATMENT OF ANIMAL CARCASSES

[75] Inventor: Bryan T. Snowden, Grapevine, Tex.

[73] Assignee: FEI, Inc., Dallas, Tex.

[22] Filed: July 28, 1971

[21] Appl. No.: 167,048

Related U.S. Application Data

[62] Division of Ser. No. 831,964, June 10, 1969, Pat. No. 3,631,563.

[52] U.S. Cl. .............................................. 17/11.2
[51] Int. Cl. ........................................... A22c 21/04
[58] Field of Search.................... 17/11.2, 15, 47, 17/51

[56] References Cited
UNITED STATES PATENTS

| | | |
|---|---|---|
| 2,820,245 | 1/1958 | Turner .............................. 17/11.2 |
| 3,074,103 | 1/1963 | Roth et al. ........................... 17/47 |
| 3,178,763 | 4/1965 | Kolman .......................... 17/11.2 X |
| 3,561,040 | 2/1971 | Floden ............................. 17/11.2 |

*Primary Examiner*—Lucie H. Laudenslager
*Attorney*—Richards, Harris & Hubbard

[57] ABSTRACT

A compartmented housing is inclined at a predetermined angle relative to the horizontal, with a path being defined through the housing for travel of animal carcasses, such as poultry, therethrough. Spray nozzles project from a generally smooth inner surface of the housing for directing high temperature steam upon preselected portions of the animal carcasses. The entry of ambient air into the housing is regulated to maintain a desired temperature within the housing. A prewetting station initially wets the animal carcasses prior to entry into the compartmented housing.

4 Claims, 17 Drawing Figures

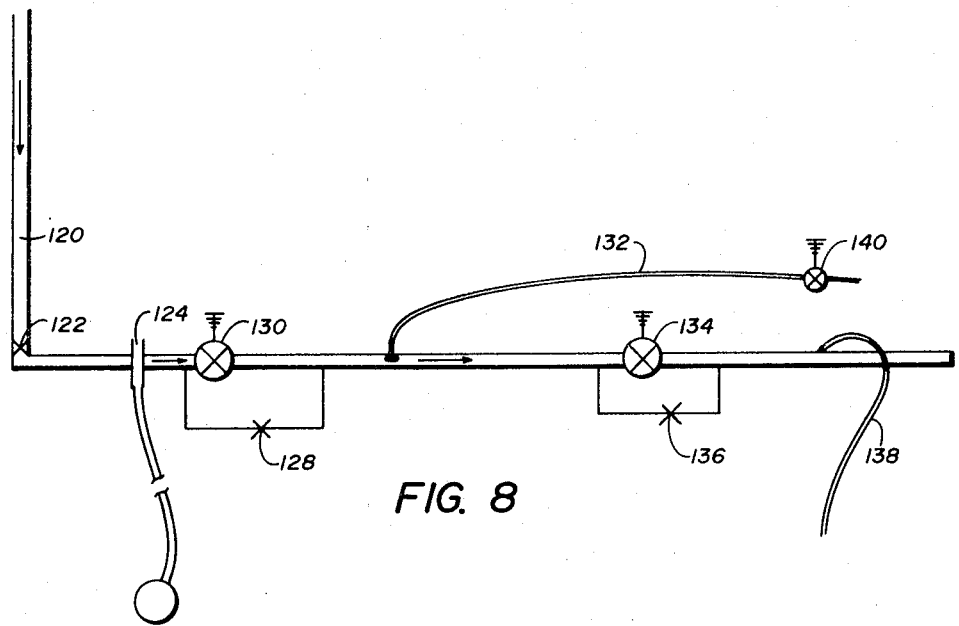
FIG. 8
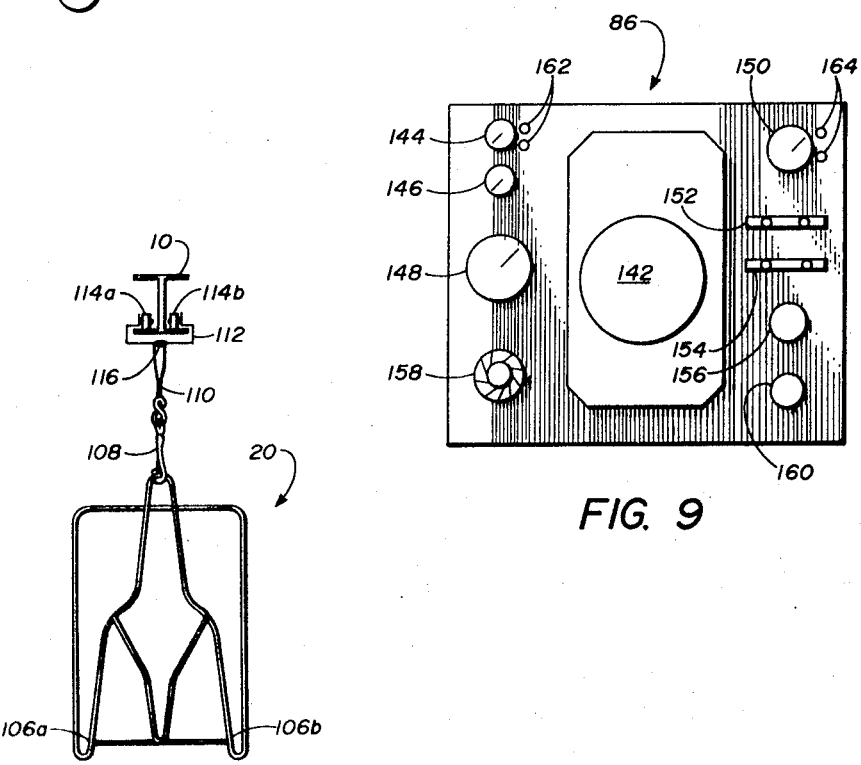
FIG. 9
FIG. 10

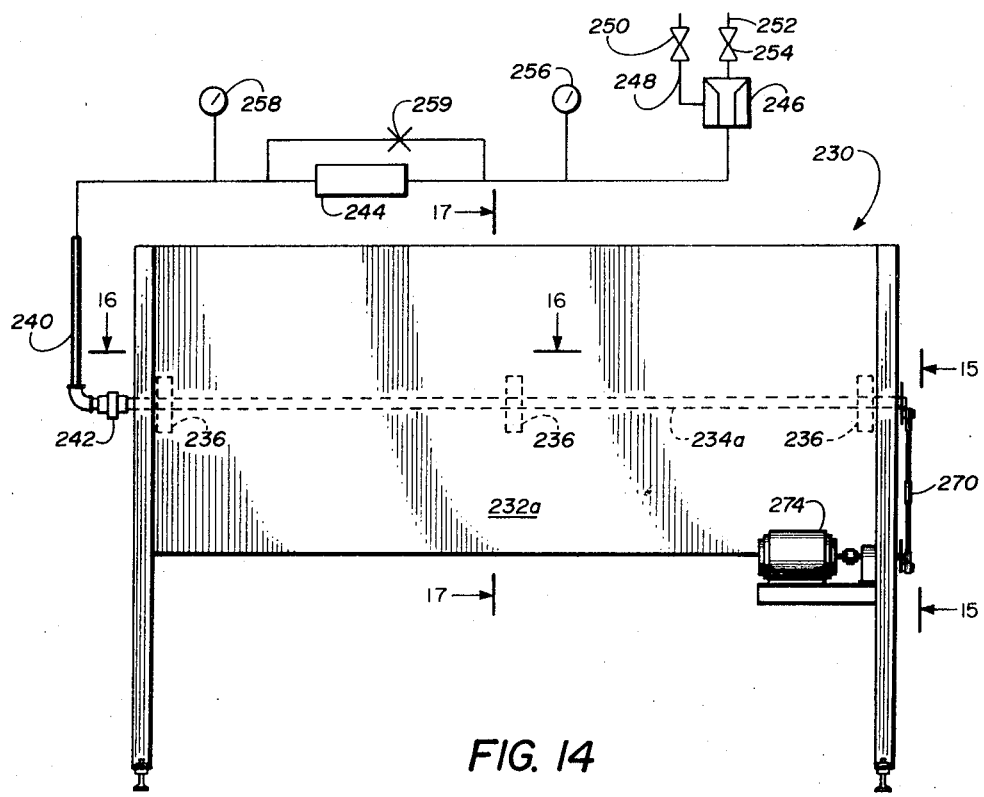
FIG. 14
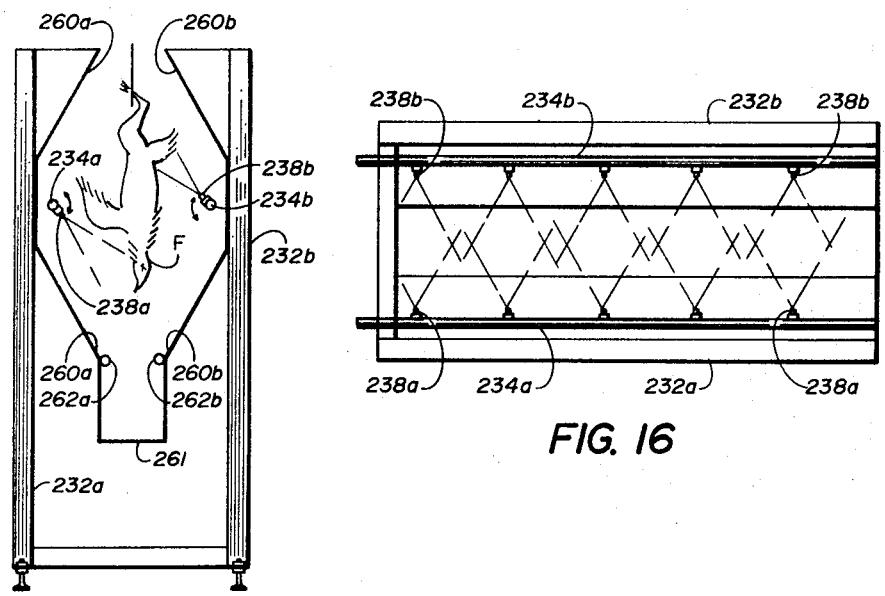
FIG. 17
FIG. 16

VAPORIZING APPARATUS FOR TREATMENT OF ANIMAL CARCASSES

RELATED APPLICATIONS

This application is a division of U.S. Pat. No. 3,631,563, issued Jan. 4, 1972, Ser. No. 831,964 filed 6/10/69 which was an improvement over U.S. Pat. No. 3,561,040, issued Feb. 9, 1971, and assigned to the present assignee.

FIELD OF THE INVENTION

This invention relates to apparatus for treating animal carcasses, and more particularly to a system for treating fowl such as poultry to destroy surface bacteria and to loosen the feathers thereof to facilitate subsequent defeathering.

THE PRIOR ART

It has been found necessary to treat fowl in order to loosen the feathers thereon preparatory to mechanical picking of the feathers. A common technique for such treatment of fowl has heretofore included immersing the fowl in one or more tanks of hot scalding water. Such techniques have been subject to numerous disadvantages including contamination by accumulated filth and residue from the previous fowl. Such water tanks require repeated cleaning, but still remain ineffective in killing surface bacteria such as Salmonella, as scalding water must generally be kept below temperatures of about 140° F. to avoid cooking the poultry. These hot water tanks result in ingestion of contaminated water by the fowl during passage therethrough and leaves bacteria on the skin of the fowl which is driven into the meat of the fowl by the mechanical picking fingers subsequently utilized to defeather the fowls.

Even in the face of such well-known deficiencies in the hot water immersion techniques described, such immersion techniques are widely and generally exclusively used in present commercial fowl defeathering operations.

It has been heretofore proposed to utilize steam for treatment of animal carcasses, and particularly fowl. For instance, U. S. Pat. Nos. 2,152,082 and 2,152,083, granted to Onorato et al. on May 29, 1939, disclose the use of steam upon fowl. Additionally, a fowl defeathering apparatus and method employing a vaporized steam spraying procedure was disclosed in U. S. Pat. No. 2,972,167, granted Feb. 21, 1961 and U. S. Pat. No. 3,074,103, granted Jan. 22, 1963, to Roth et al. Such steam treatment as disclosed in the Onorato et al. and Roth et al. patents has presented improvements in sanitary feather loosening processes over the standard immersion processes. However, the particular constructions and techniques disclosed by such patents have not been widely accepted in the fowl processing trade, as such constructions and techniques require substantially modifying existing fowl processing lines and facilities.

In an attempt to overcome the deficiencies of the prior art, an improved fowl processing method and apparatus was developed and disclosed in Ser. No. 749,804, filed Aug. 2, 1968, now U. S. Pat. No. 3,561,040, by Folke K. Floden and assigned to the present assignee. This method and apparatus involves transportation of animal carcasses along a generally U-shaped path inclined at a predetermined angle relative to the horizontal while directing steam spray nozzles at the carcasses and maintaining the temperature within the U-shaped path at a predetermined temperature limit. This method and apparatus has the advantage of being easily inserted in an existing fowl picking line and provides extremely sanitary and efficient loosening of fowl feathers.

However, it has subsequently been found that the back portions of fowls, and in particular poultry, are substantially more difficult to loosen than the remaining portions of the fowl, and it is thus important to direct a maximum and constant amount of high temperature steam upon the back portions of the fowl for optimum results. However, in the previous method and apparatus disclosed in the previously identified Ser. No. 749,804, the fowl are allowed to freely pivot while dangling from an overhead conveyor, and thus all portions of the fowl were generally equally exposed to steam treatment. Additionally, it has been found that it is extremely important to prevent areas of extreme heat from forming away from the body of the fowl in the vicinity of the overhead conveyor, and that care must be taken to prevent cold spots in the vicinity of the vents and drains open to the ambient atmosphere. Moreover, it has been found advantageous to eliminate super heating of the steam directed against the fowl by adding metered amounts of water to the source of steam. Improvements have also been made for thoroughly prewetting the fowl before subjecting the fowl to steam treatment.

SUMMARY OF THE INVENTION

In accordance with the present invention, an enclosed housing is provided through which fowl may be carried along a predetermined path. A conveyor is supported in the housing to define the predetermined path and carries shackles for suspending the fowl in spaced relationship therealong. Spray nozzles extend along the housing on opposite side of the predetermined path and direct a high temperature spray medium against the fowl in order to loosen the feathers thereof and also to destroy the bacteria carried by the fowl. Structure is provided for constraining the movement of the shackles such that the back areas of the fowl are maintained in a preselected position along the predetermined path in order to receive maximum amounts of the high temperature spray medium.

In accordance with another aspect of the invention, an enclosed housing is positioned to extend at an angle to the horizontal which is substantially less than 90°. An overhead conveyor is supported in the housing and extends therethrough along a predetermined path along which slaughtered animals may be carried. Spray nozzles are supported on opposed wall portions of the housing to direct vaporized spray against the animals which are carried through the housing. The entry of ambient air into the housing is selectively regulated so as to create an upward draft within the housing for regulation of internal temperature of the housing. Wall structure is disposed within the upper portion of the housing to prevent intense heat buildup in the area of the overhead conveyor, and to provide an area of highest heat buildup in the vicinity of the animals below the overhead conveyor.

In accordance with another aspect of the invention, a vaporizing spray apparatus for treatment of animal carcasses includes an enclosed housing positioned to extend at an angle relative to the horizon which is substantially less than 90°. An overhead conveyor is supported and extends through the housing to define a predetermined path along which the animal carcasses are carried. Structure is provided to add water to a supply of steam to supersaturate the steam. Spray nozzles are supported on opposed wall portions of the enclosed housing for directing vaporized steam against the animal carcasses carried through the housing by the conveyor. Entry of ambient air is permitted and regulated to create an upward draft through the housing as required to regulate the housing internal temperature.

In accordance with a more specific aspect of the invention, an enclosed housing is positioned to extend at an angle relative to the horizontal within the range of approximately 20°–35°. A generally rectangular housing is disposed at the lower end of the enclosed housing and includes inlet and outlet doors. A central divider structure extends longitudinally along the length of the housing to partition the housing into two generally parallel compartments. An overhead conveyor is supported in and extends through the housing along a generally U-shaped path. Spray nozzles are supported on opposed wall portions of the house for directing steam against the fowl carried through the housing by the conveyor. A bar extends through the housing for maintaining the fowl supported by the conveyor such that back portions of the fowl are directed towards the divider structure for reception of the hottest temperature steam during travel through the predetermined path. Damping structure is provided in the upper portion of the housing for regulating the entry of ambient air into the housing to maintain the temperature in the housing within well defined limits. Circuitry is responsive to stoppage of the conveyor for terminating the supply of steam to the spray nozzles and for opening the damper for admission of ambient air into the housing to prevent cooking of the fowl.

In accordance with another aspect of the invention, a prewetting station is provided for use with the steam spraying housing previously described which includes first and second conduits disposed on opposite sides of the predetermined path through which the fowl are carried by an overhead conveyor. Each of the conduits are connected to a source of pressurized heated fluid, the conduits being slanted to the horizontal at opposing angles to insure even wetting of the fowl during the passage therethrough.

In accordance with another aspect of the invention, another embodiment of the prewetting station for use with the present vaporizing system is provided wherein nutating spray nozzles spray pressurized heated fluid uniformly upon fowl as the fowl are carried through the predetermined path by overhead conveyor structure.

DESCRIPTION OF THE DRAWINGS

For a more complete understanding of the present invention and for other objects and advantages thereof, reference is now made to the following description taken in conjunction with the accompanying drawings, in which:

FIG. 8 is a schematic diagram of portions of the steam input system for the apparatus shown in FIG. 3;

FIG. 9 is a front view of the control panel of the system shown in FIG. 3;

FIG. 10 is a side view of a typical shackle utilized in the system shown in FIG. 3;

FIG. 14 is a side view of another embodiment of the prewetting station for use with the present invention;

FIG. 16 is a top view of the prewetting station taken along the section lines 16—16 shown in FIG. 14; and FIG. 17 is an end view illustrating the oepration of the prewetting station taken along the section lines 17—17 shown in FIG. 14.

DESCRIPTION OF THE PREFERRED EMBODIMENTS

Figures 1, 2:
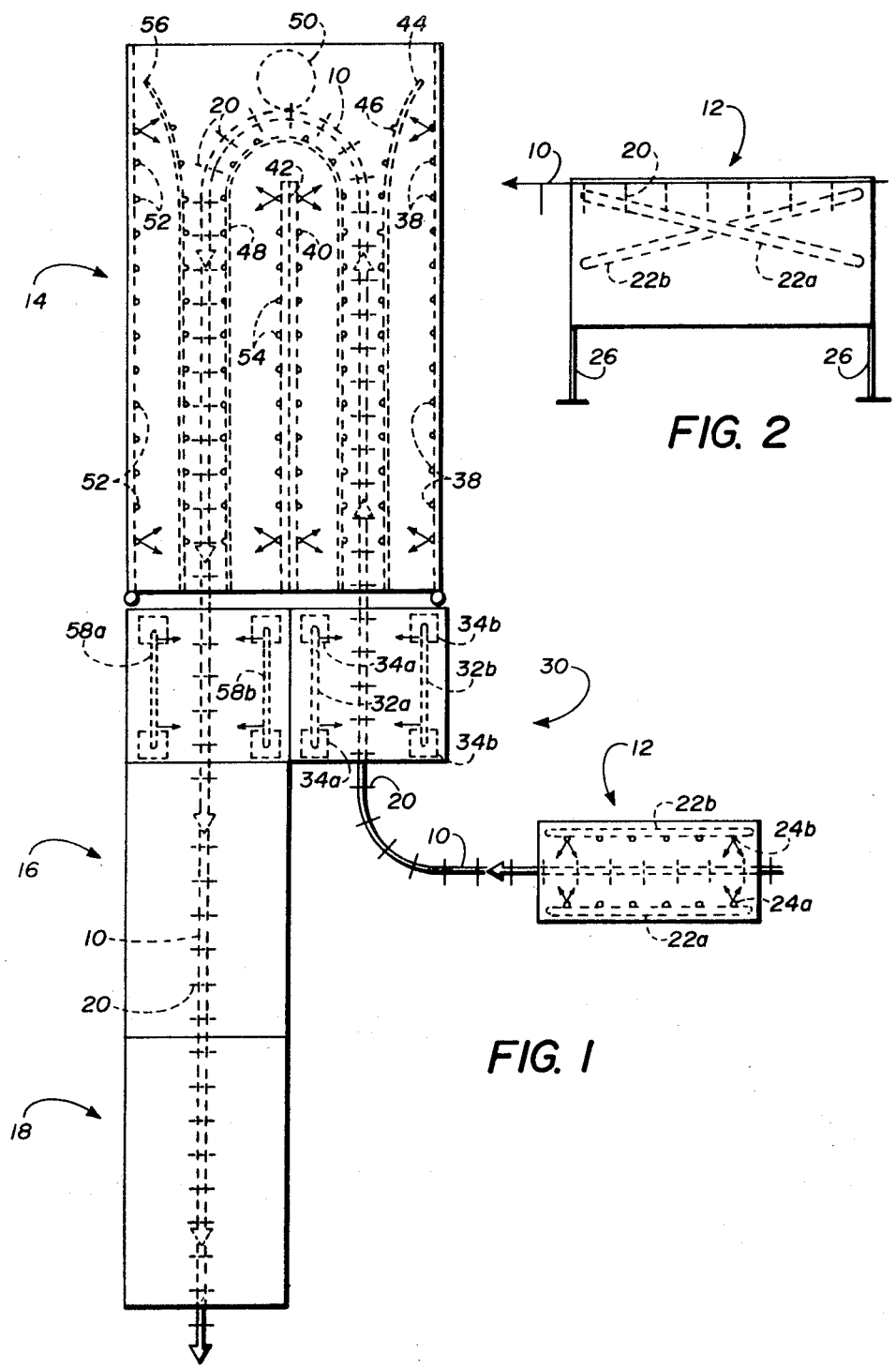
FIG. 1 is a somewhat schematic plan view of the present vaporizing system.
FIG. 2 is a side view of the prewetting station shown in FIG. 1.

Referring now to FIG. 1, a conventional overhead roller-chain conveyor 10 extends along a predetermined path through a prewetting station 12, a vaporizing station 14 and defeathering stations 16 and 18. A plurality of pivoted shackles schematically illustrated by numerals 20 are spaced along the length of the conveyor 10 and animal carcasses, not shown in FIG. 1, are suspended therefrom for movement along the path of the conveyor 10. It will be understood that the present invention is useful for the processing of animal carcasses other than fowl, such as for pretreating hog carcasses prior to dehairing treatment. In the preferred embodiment, for simplicity of illustration, the processing of fowl will be hereafter described.

The prewetting station 12 comprises a metal chamber open at opposite ends and including a pair of fluid conduits 22a–b. A plurality of spray nozzles 24a–b are spaced along the length of the conduits 22a–b. Conduits 22a–b are connected to a pressurized source of hot fluid such as water maintained at a temperature of between 120°–175° F., and preferably within the range of 125°–160° F. The hot fluid is forced from the spray nozzles 24a–b for impingement upon the bodies of the fowl as they are carried therethrough by the overhead conveyor 10.

FIG. 2 illustrates a side view of the prewetting station 12, wherein it may be seen that conduit 22a slopes with respect to the horizontal in one direction while conduit 22b slopes with respect to the horizontal in the opposite direction. This opposed slope of the conduits 22a–b provides an even distribution of hot water upon the fowls as they travel therethrough. Legs 26 of the prewetting station 12 are adjustable in height to enable use of the station with existing overhead conveyor lines. The purpose of the prewetting spray is to wash loose feathers, dirt and other debris from the fowl prior to their entering the main housing of the apparatus. Also, the hot fluid pretreats the feathers and tends to make the operation of the vaporizing station more efficient. The debris in the wash water falls into an open drain tunnel, not shown, which extends under the prewetting system and along which debris may be washed away in a known fashion.

After passage through the prewetting station 12, the fowl are conveyed through the inlet side of a generally rectangular chamber 30 of the vaporizing station 14 wherein the fowl are subjected to initial treatment with steam and hot water. A pair of laterally spaced steam conduits 32a-b extend along the length of the chamber 30, each of the conduits having a plurality of spray nozzles spaced therealong. In one embodiment, a spacing of approximately eight inches was found satisfactory. Each of the conduits 32a-b are connected to a source of pressurized steam at one end and are closed at the other. Lateral adjustability is provided to the conduits 32a-b so that the spacing therebetween may be varied in dependence upon the size of the fowl being treated. Closer spacing will be desirable for smaller birds such as chickens, and greater spacing between the conduits will be preferred for larger birds such as turkeys. In the embodiment illustrated, weighted bases 34a-b are provided which may be moved relative to one another by a screw crank, not shown, which can be actuated to mechanically drive the conduits 32a-b to or from one another.

After passing through the inlet portion of the chamber 30, the fowl continue along the path of the conveyor 10 into an upwardly inclined chamber, whereupon the fowl are immersed with steam spray from nozzles 38 which extend from the otherwise smooth interior walls of the upwardly inclined chamber. Additionally, the fowl are subjected to steam spray from nozzles 40 which extend from the walls of a divider partition 42 extending along the inclined chamber. In some instances, it will be desirable to eliminate the walls of the partition 42, leaving only the steam spray conduits passing therethrough to act as the divider partition for the inclined housing. A pipe 44 extends along the length of the inclined chamber and includes nozzles 46 spaced along the length thereof. Nozzles 46 spray heated water for soft scalding of the fowl when desired, and additionally spray unheated water for flushing out of the inclined chamber after use. Additionally, the pipe 44 serves to keep the shackles 20 from rubbing against portions of the interior of the inclined chamber, as will be subsequently described.

A generally U-shaped pipe 48 is also disposed within the inclined chamber and includes a plurality of nozzles spaced therealong for the admission of heated water in the range of 120°-175° F. to wet the fowl at various stations along the inclined chamber. An additional extremely important function of the pipe 48 is to bear against the shackles 20 to prevent the shackles from pivoting while traveling along the path of the conveyor 10, so that the back of the fowl is maintained toward the divider partition 42. The fowl are initially placed on the shackles 20 in the desired position. As the shackles are conventionally tied together, the position of the fowl do not change and thus the fowl enter the present system in the desired position, such that the backs of the fowl are maintained toward the divider partition 42. The spray from the nozzles 40 comprises high temperature steam and the nozzles are positioned extremely close to the back of the fowl for treatment. As is known, the back portions of the fowl are the most difficult to treat, and thus the present invention enables improved feather removal from the difficult back portions of the fowl.

In a similar manner as disclosed in the previously identified U. S. Pat. No. 3,561,040, issued Feb. 9, 1971, ambient air is selectively admitted through a duct stack 50 located in the upper portion of the vaporizer station 14 in order to maintain the temperature within the vaporizer station 14 at a preselected high temperature. The fowl travel along the generally U-shaped path of the conveyor 10 within the vaporizer station 14, passing down the inclined chamber for further treatment by steam admitted through nozzles 52 projecting from the smooth interior walls of the chamber. Additional steam spray is admitted through nozzles 54 which project from the divider partition 42.

A pipe 56 extends generally along the length of the inclined chamber in a similar manner as pipe 44, and includes nozzles spaced therealong for spraying the fowl with heated water and for admitting unheated water for flushing of the vaporizing station 14 after use. The treated fowl are then passed through the exit portion of the generally rectangular chamber 30, wherein a final steam spray is admitted from conduits 58a-b. Conduits 58a-b include weighted base portions which include crank structure for moving the conduits to or from one another to accommodate different sizes of birds, in the manner previously described. After the final steam treatment, the fowl are carried through conventional picking machine 16 and 18, wherein the feathers of the fowl are removed by flexible picking fingers in the well-known manner.

Figure 3:
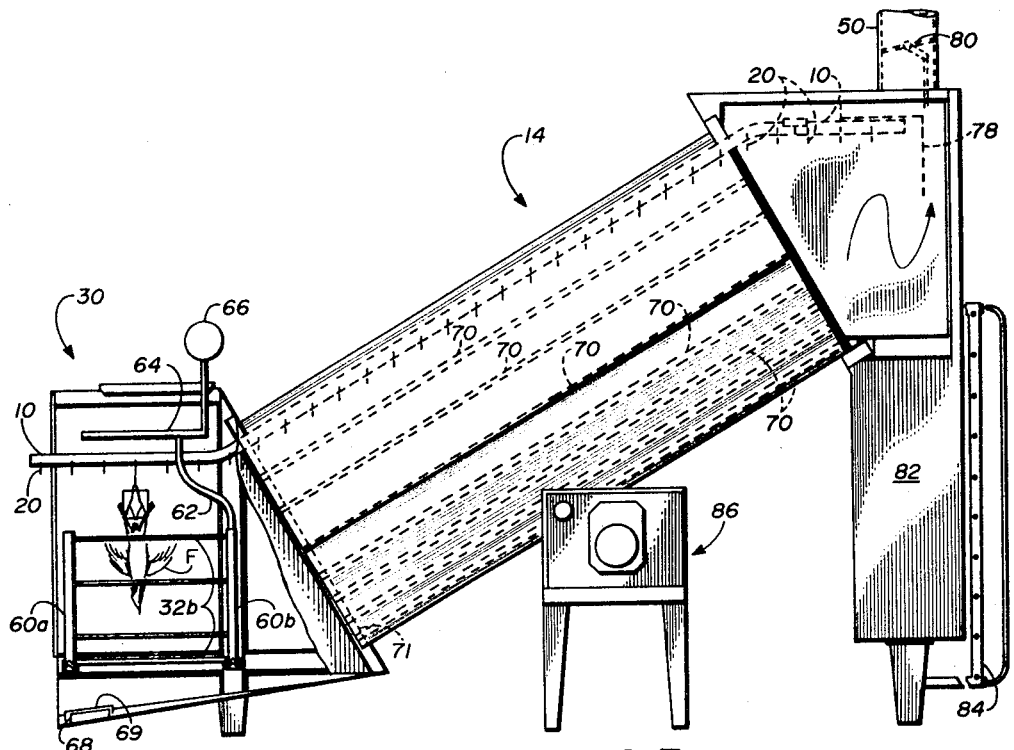
FIG. 3 is a side view of the vaporizing station shown in FIG. 1.

FIG. 3 illustrates a side view of the vaporizing station 14, with a portion of the sidewalls on the chamber 30 removed. The conveyor 10 comprises an overhead I-beam rail along which ride conventional interconnected roller-chain segments which are connected to the shackles 20. The fowl F are suspended by their legs from the shackles and are carried in the generally U-shaped path along the inclined vaporizing station 14. The conduits 32b are connected to spaced apart upright standards 60a-b. Each of the conduits 32b are open at one end and are threadedly engaged with the hollow inlet standard 60b. Heated steam is supplied to the standard 60b via a rubber steam hose 62 which is flexible to allow the lateral movement of the conduits 32b in the manner previously described.

A steam manifold 64 connects to a steam source pipe 66. The ends of the conduits 32b connected to the upright standard 60a are closed. The lower portions of the upright standard 60a-b are supported on angles for ease of lateral movement. A drain 68 is provided in the lower portion of the chamber 30 to enable condensed steam, water and debris to run out. A baffle plate 69 is provided over the drain opening to eliminate steam and temperature from exhausting through the opening. Ambient air is allowed to pass into the housing through the drain 68. Plate 69 is adjustable in position relative to the drain 68 to act as a damper to enable a certain amount of regulation of the ambient air flow through the inclined housing.

Figure 4:
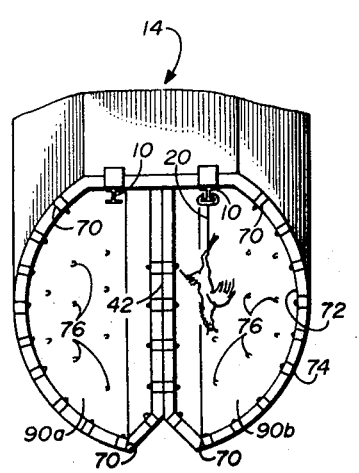
FIG. 4 is a sectional view of the inclined compartmented vaporizing chamber taken along section lines 4—4 FIG. 3.
Figure 5:
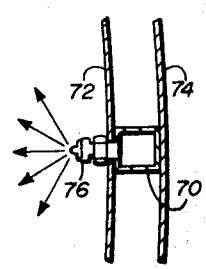
FIG. 5 is a sectional view of a spray nozzle utilized in the vaporizing system shown in FIG. 3.

A plurality of pipes 70 are circumferentially spaced around the perimeter of the inclined vaporizing station 14. The lower end of the pipes 70 are connected to a circular header 71 connected to a source of steam. For a more detailed explanation of the structure for feeding steam to the pipes 70, the disclosure of the previously identified U. S. Pat. No. 3,561,040, issued Feb. 9, 1971, is herein incorporated by reference. Nozzles are spaced along the length of each of the pipes 70 for spraying the fowl with steam. The cross section of the inclined chamber of the vaporizing station 14 is preferably generally circular, as shown in FIG. 4. The pipes 70 are preferably attached between inner and outer skin layers 72 and 74 in the manner described in the previously identified U. S. Pat. No. 3,561,040, issued Feb. 9, 1971. This is best shown in FIG. 5, wherein a nozzle 76 extends through the inner skin layer 72 from a square cross section pipe 70. As shown in FIG. 4, the interior wall 72 of the inclined vaporizing chamber 14 is smooth and unbroken, except for the projection of the nozzles 76 therefrom. This permits the vaporizing station to be easily cleaned and maintained in a sanitary condition. In the preferred embodiment, conventional valves (not shown) are disposed in each pipe 70 and are manually adjustable within each of the pipes 70 in order to allow adjustment of the amount of steam pressure applied within each pipe. For instance, the highest velocity steam will normally be directed to the area behind the wings of the fowl, while the lowest velocity steam will be directed toward the breast.

Referring again to FIG. 3, an important aspect of the invention is the provision of a baffle plate 78 in the upper portion of the inclined chamber. The duct stack 50 includes a damper 80 operable in the manner described in detail in the previously identified U. S. Pat. No. 3,561,040, issued Feb. 9, 1971. Baffle plate 78 prevents the hottest temperature steam medium from being directly exhausted through the duct stack 50. Baffle plate 78 has been found to substantially increase the temperature within the vaporizing station 14 and to eliminate hot spots and the like. Preferably, the majority of the structure of station 14, including baffle 78, is constructed of stainless steel metal. A support pedestal 82 securely supports the inclined chamber at the prescribed angle. A ladder 84 is provided on the support pedestal 82 to provide ease of access for maintenance and the like. A control panel 86, to be later described in detail, is provided to anable the operation of the system to be monitored and to be accurately controlled by an operator.

As shown in FIG. 3, the inclined chamber of the vaporizing station 14 is provided with an angle to the horizontal. This angle assists in maintaining the desired internal temperature, as well as enables the system to be maintained in a sanitary condition. An internal temperature in the range of about 140° to 175° F. is very effective for bacteria destruction and loosening of the feathers. The present device readily controls the desired treating temperature of within several degrees Fahrenheit throughout essentially the entire length of the system. Thus, the fowl are subjected to a substantially constant and uniform predetermined temperature for substantially the full U-shaped path of travel through the station 14.

As will be later described, the temperature sensing and control system of the invention operates a motor, not shown, which controls the position of the damper 80. Upon sensing of an undesirable increase in the internal temperature of the station 14, the damper 80 is opened and ambient air enters through the lower end of the station 14. The ambient air is drawn into the housing by convection and rapidly passes upwardly along the inclined chamber along both sides of the divider partition 42, due to the draft created by the opening of the damper 80. The ambient air then passes out of the duct stack 50. It will be understood that in some instances a fan may be inserted in the stack 50 to cause a forced draft of the ambient air therethrough. This ambient air flow is in the same direction as the travel of the fowl during one segment of the generally U-shaped path through the station, and in an opposite direction for the other segment of the path through the station. Such passage of ambient air rapidly reduces the temperature within the station 14 to the desired level, that temperature condition being sensed by the system which then operates the damper 80.

The upward inclination of station 14 may vary between certain preferred limits so long as the angle chosen permits the rapid upward flow of ambient air as just described. Also, the inclination chosen is substantially less than vertical so that the housing will conserve floor space and yet will permit the system to be positioned in buildings having normal height ceilings.

Inclination in a range from approximately 10° approximately 40° relative to the horizontal has been determined as necessary for meeting the stated needs and to permit the apparatus to perform its desired objectives. An inclination falling within a narrower range of approximately 20° to 35° has been found preferable, with an inclination of approximately 20° being highly effective for insuring close temperature control while permitting the apparatus to conserve floor space and without creating any necessity to alter or raise the roof of any conventional building in which the apparatus is installed. Further such inclination produces the desired results without adjacent fowl contacting each other, and without requiring any modification in the shackle spacing of a conventional overhead conveyor.

The inclination of the vaporizing station 14, illustrated in FIG. 3 has further advantages, as the vaporized medium, and particularly steam, sprayed from the nozzles within the station will pass upwardly along both sides of the housing toward the stack 50 due to the draft created therethrough. This draft keeps the medium moving and prevents formation of hot spots in the housing, without requiring expensive circulation equipment for that purpose. Moreover, the inclination insures that feathers or other debris which are inadvertently carried into the housing with the fowl and which are removed from the fowl by the spray will flow downwardly with condensed liquid toward the lower end of the housing and out the drain 68.

As shown in FIG. 4, the inclined chamber is constructed from identical housing portions, the housing portions defining lower drainage channels 90a–b therein such that the fluid medium may drain downwardly and out the drain 68. Constructing the chamber in two portions facilitates transportation and installation of the system.

Figure 6:
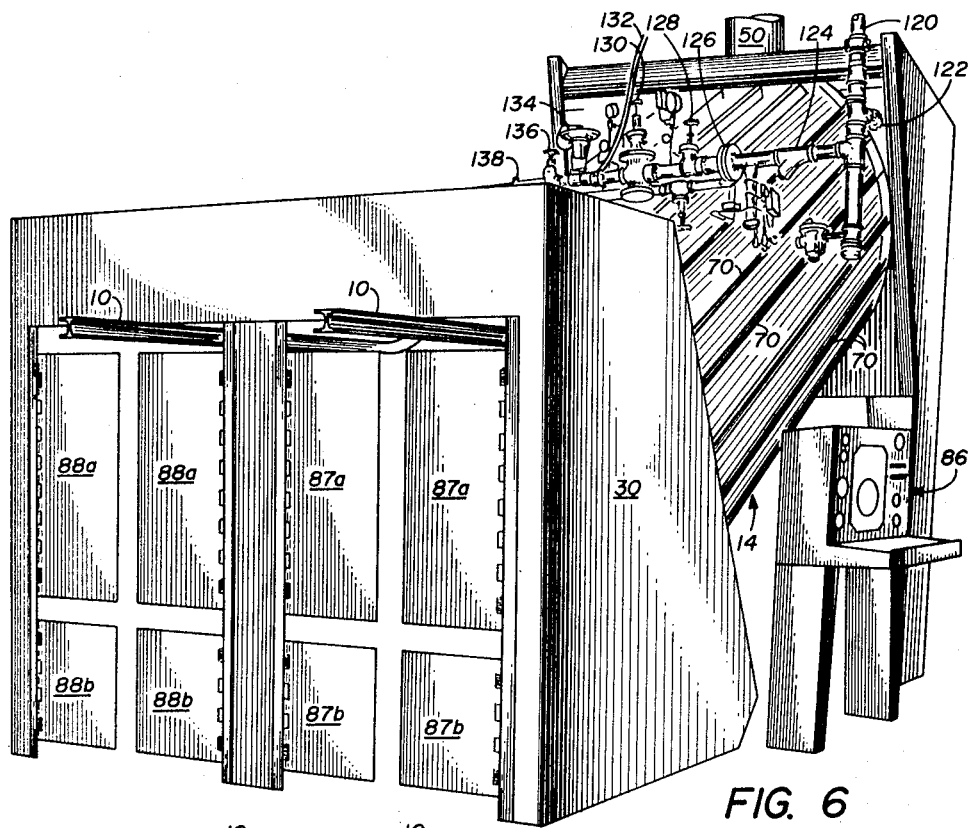
FIG. 6 is a perspective view of the vaporizing system shown in FIG. 3.

FIG. 6 illustrates a perspective view of the vaporizing station with the outer skin layer 74 removed so that the pipes 70 are visible. The generally rectangular entrance and exit chamber 30 includes spring-loaded swinging dutch doors 87a–b which swing inwardly to allow the entrance of fowl carried by the overhead conveyor 10. For relatively small fowl such as chicken, only the doors 87a are open to prevent loss of steam and temperature. For larger birds such as turkeys, both sets of the doors 87a-b are swung inwardly. Exit doors 88a-b are spring-loaded to swing outwardly to enable exit of the treated fowl on the overhead conveyor 10. Chamber 30 is preferably constructed from stainless steel to insure sanitary conditions and to facilitate maintenance.

Figure 7:
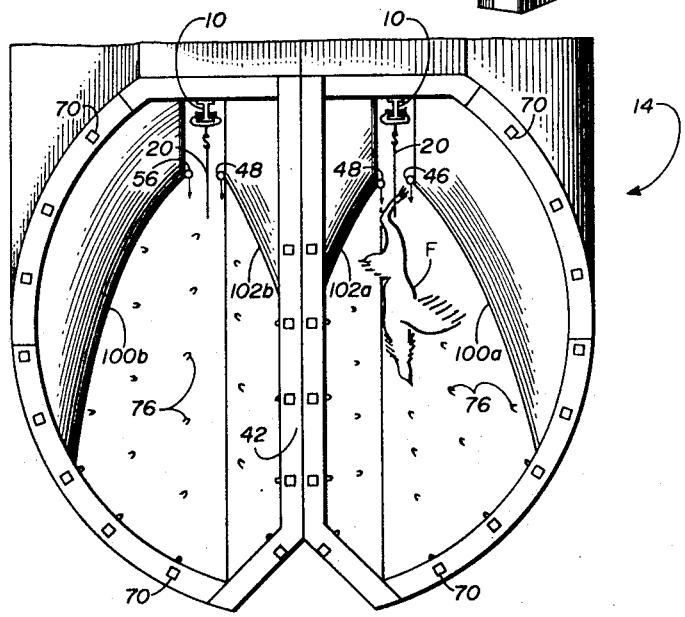
FIG. 7 is a sectional view of another embodiment of the inclined housing shown in FIG. 6.

FIG. 7 illustrates a cross section of the preferred construction of an inclined vaporizer housing according to the invention. The housing is constructed in the same general manner as the housing shown in FIG. 4. However, in the preferred embodiment, false ceilings 100a-b and 102a-b are installed along the length of the inclined housing. Certain of the pipes 70 shown in FIG. 4, and their associated nozzles 76, are blocked off in the preferred embodiment to accommodate the false ceilings 100a-b and 102a-b.

The false ceilings 100a-b and 102a-b are preferably constructed from stainless steel and are configured as shown to maintain the area of most intense heat in the vicinity of the body of the fowl F, rather than in the vicinity of the overhead conveyor 10. By reference to FIG. 4, it will be understood that the area of most intense heat tends to form near the upper parts of the chamber, but the arrangement shown in FIG. 7 causes this area of most intense heat to be directed immediately about the fowl and therefore increases the beneficial results provided by the inclined chamber. In some instances, it will be desirable to construct the cross section of the inclined chamber such that the walls thereof follow the general shape defined by the false ceilings 100a-b and 102a-b.

FIG. 7 also illustrates another extremely important aspect of the invention whereby the back portions of the fowl F are maintained in a predetermined position so as to receive the full force of the spray medium issued from the spray nozzles disposed in the center partition 42. The previously noted valves (not shown) in the pipes 70 in the partition 42 are adjusted so that the highest velocity steam is admitted from the spray nozzles to impinge upon the back portion of the fowl. This function of the invention is accomplished by means of the pipes 46, 48, and 56, previously described. In addition to carrying spray medium and washing medium, these pipes maintain the shackles 20 in a generally parallel plane between the pipes so that the back of the fowl F is directed toward the partition 42 during its entire travel through the station 14. The back portion of the fowl is thus maintained relatively close to the spray nozzles 76 and receives an intense amount of spray medium to loosen and treat this stubborn feather area. Pipes 46 and 56 also tend to maintain the shackles 20 in the predesired position, and prevent the shackles 20 from rubbing against the stainless steel false ceilings 100a-b.

FIG. 10 illustrates a conventional shackle 20, which may for instance comprise the shackle manufactured and sold by the Gainesville Manufacturing Company of Gainesville, Georgia. Alternatively, the conventional automatic shackles well known in the industry may be used in place of these conventional shackles. The feet of the fowl are disposed in the portions 106a-b of the shackle 20. The shackle 20 is mounted on a swivel clamp 108 which depends from a rigid bar 110 connected to a bifurcated support member 112. Support member 112 is mounted upon dolly wheels 114a-b which roll along the lower portion of the overhead conveyor I-beam 10. The drive chain of the conveyor system is attached generally at 116 for moving of the shackle on the predetermined path. Due to the swivel snap 108, the shackle 20 is generally free to pivot in any direction. However, by the use of the pipes 46, 48 and 56, in the manner previously described, the shackle 20 is maintained in a desired position during travel of the fowl through the vaporizing station 14 such that the back portions thereof are suitably treated.

Referring to FIGS. 6 and 8, the spray medium supply system for the vaporizer conveyor housing 14 is illustrated generally by the numeral 120. This supply comprises a conduit 120 which supplies steam under pressure to the system. In the preferred embodiment, steam pressure of 75 p.s.i. is provided via conduit 120. A manually operable valve 122 is provided for manual control of the steam. The steam passes through a strainer 124 and through an orifice plate measuring device 126.

As will be later described, device 126 provides indication of the pressure to the control panel 86. A bypass valve 128 is provided for bypassing of the steam in case the pressure regulator valve 130 malfunctions. Pressure regulator 130 is a diaphragm operated regulator to reduce the steam pressure to about 25 p.s.i. A supply of tap water is provided to the steam flow via a hose 132. In a preferred embodiment, a flow of about one gallon a minute is provided via a one quarter inch diameter hose 132 to supersaturate the steam. A pneumatic operated control valve 134 is provided to regulate the manifold steam pressure in response to controls from the control panel 86. A bypass valve 136 enables operation of the system upon malfunction of the valve 134. Steam is input into the vaporizing station at the inlet 138.

Referring to FIG. 8, a valve 140 is shown disposed in the water line 132. Valve 140 is operable in response to stoppage of the overhead conveyor 10 in order to shut off the supply of water.

The addition of water to the present steam spray means is extremely important. By reducing the pressure of the steam input to the system, the steam tends to become superheated and dry. It has been found that such superheated steam is undesirable in the processing of fowls with the invention. Thus, water is selectively injected into the steam line in order to desuperheat, or supersaturate, the steam applied to the fowl. This use of wet or moist steam is further emphasized in the invention by the use of selective water spray from the pipes of the invention.

FIG. 9 illustrates the front panel of the control panel 86. A recorder 142 provides a continuous permanent visual recording of the temperature and steam pressure of the invention. The manifold pressure of the system is indicated by a meter 144, while the water temperature utilized in the invention is indicated by the meter 146. The steam flow magnitude of the invention is recorded by meter 148, while the temperature within the housing is indicated by meter 150. Warm-up lights 152 are provided, as are start lights 154 upon the panel. A stop button 156 is provided to stop operation. A variable steam flow control switch 158 is provided for operation of the valve 134. A temperature control damper knob 160 is provided for manual operation of the damper 50. High and low pressure indicating lights 162 are provided as are high and low temperature lights 164.

Figure 11:
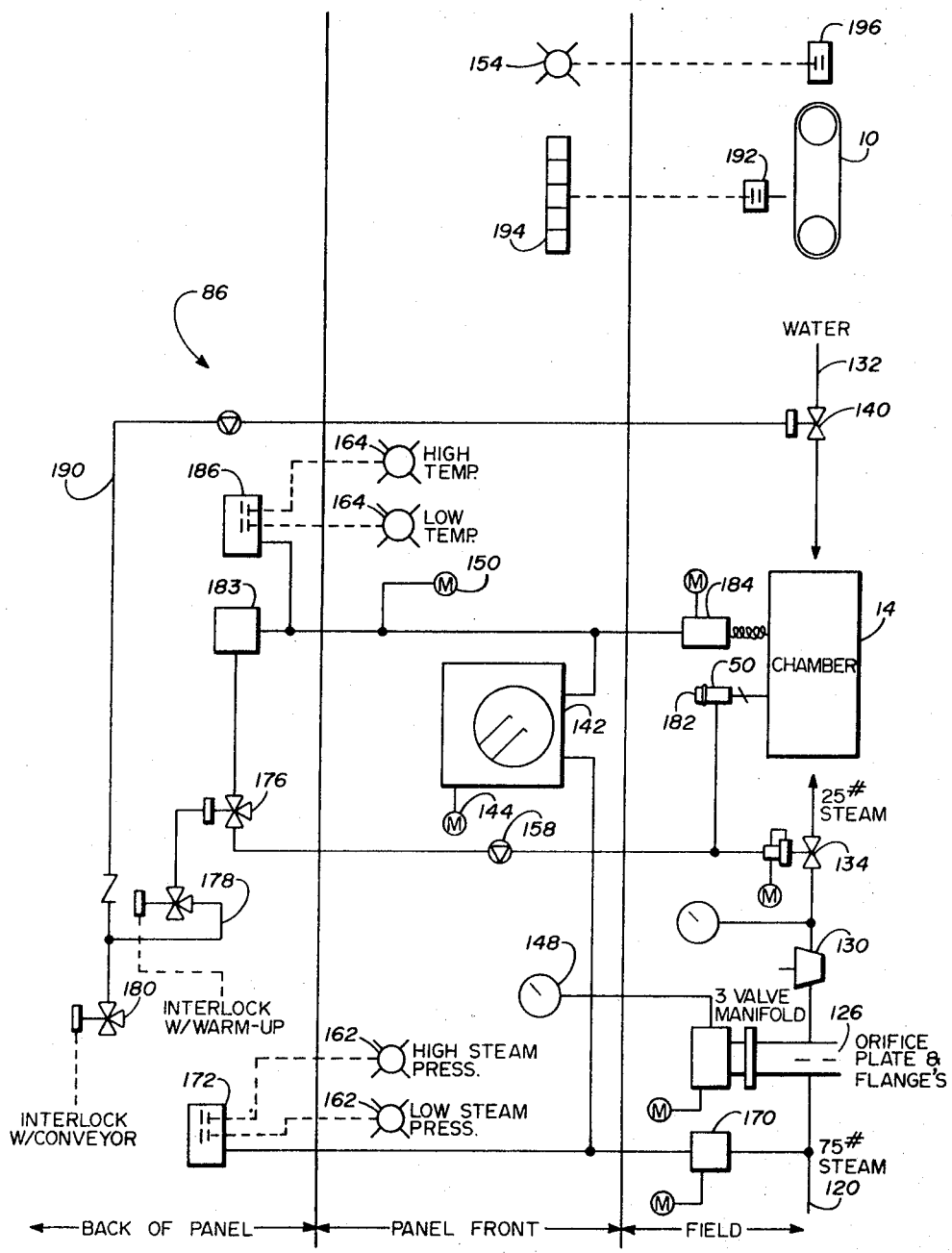
FIG. 11 is a schematic view of the steam, water and control system for the invention.

FIG. 11 schematically illustrates the interconnections between the vaporizing station 14 and the control and display panel 86. As previously noted, steam enters the main line 120, the pressure thereof being sensed by a pressure transmitter 170 which in turn controls the illumination of the high and low steam pressure lights 162. In the preferred embodiment of the invention, a pressure transmitter 170 comprises the P-5210 Pressure Transmitter manufactured and sold by the Johnson Service Company of San Francisco, Calif. The pressure switch 172 may, for instance, comprise the Switch P-7210 manufactured and sold by the Johnson Service Company. Recorder 142 may for instance comprise the 76J2 Pen Recorder manufactured and sold by the Taylor Company. While specific equipment models will be described for the preferred embodiment of the invention, it will be understood that various other conventional components could be alternatively utilized for practice of the broad aspects of the invention.

The steam flow is sensed by the orifice plate sensor 126, which may for instance comprise the 273A Differential pressure transmitter manufactured and sold by the Barton Company. The output of the orifice plate and the flow transmitter is recorded by meter 148 on the display panel. The pressure regulator valve 130 is provided to reduce the pressure of the steam to about 25 p.s.i. This produced steam pressure is fed through the pneumatic operated control valve 134 for application to the vaporizing chamber 14. Control of pressurized air to the valve 134 is provided via the switch 158. Switch 158 is connected to the three-way air valve 176, which for instance may comprise the V-6133 Air Valve manufactured and sold by the Johnson Service Company.

A solenoid air valve 178 is manually operated from the front of the panel. A similar solenoid valve 180 is interconnected with the overhead conveyor 10 of the system. When the overhead conveyor stops, the valves are operated to supply air under pressure to the valve 134 to stop the supply of steam fed to the vaporizing chamber to prevent cooking of the fowl. Additionally, upon stoppage of the overhead conveyor 10, valves 178 and 176 are operated to supply pressurized air to a damper motor 182 in order to open the damper 80 to quickly ventilate the vaporizing chamber 14 to additionally assist in preventing cooking of the birds therein.

The output of the valve 176 is fed to a controller 183 which is operable in response to the output of a temperature sensor and transmitter 184 to control a pressure switch 186. The temperature sensor 184 also controls one of the pens of the recorder 142 to provide a continuous indication of the pressure within the chamber 14. When the temperature within the chamber drops or rises below the preset temperature, the controller 183 operates a pressure switch 186 to light the necessary temperature light 164. A suitable temperature transmitter and sensor for use with the invention is the T-5210 Temperature Transmitter manufactured and sold by the Johnson Service Company.

Pressurized air is also fed via a line 188 and via line 190 to the valve 140 located in the water line 132 for control of the water being fed into the chamber in response to stopping of the overhead conveyor 10. If desired, the movement of the conveyor 10 may be monitored by a counter switch 192 which controls a counter 194 located on the face of the display. A proximity switch 196 is disposed adjacent the overhead conveyor 10 in order to control the operation of the start light 154.

Figure 12:
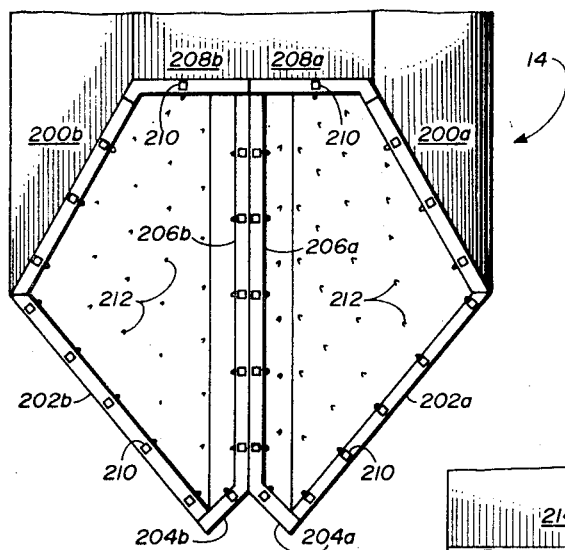
FIG. 12 is a somewhat diagrammatic sectional view of another embodiment of the invention.
Figure 13:
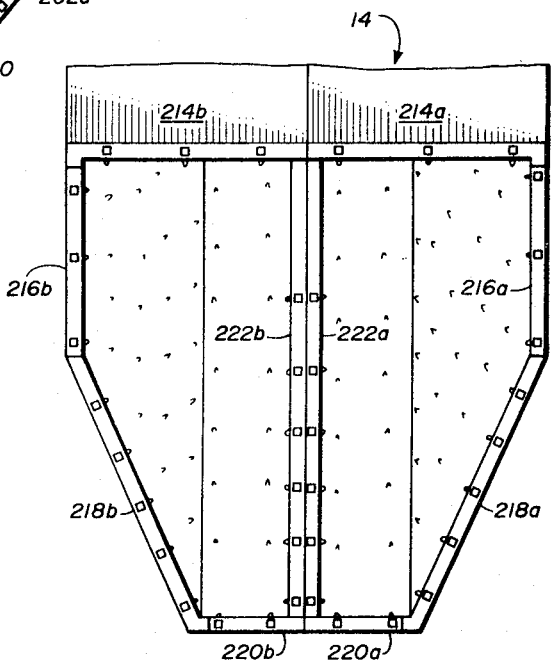
FIG. 13 is a somewhat schematic view of another embodiment of the invention.

Referring to FIGS. 12 and 13, it will be understood that various configurations of an inclined vaporizing chamber may be utilized with the invention. FIG. 12 illustrates one embodiment utilizing straight structural members to facilitate manufacture. In this structure, rectangular and flat pieces of stainless steel may be utilized to fabricate the generally V-shaped sides 200a-b and 202a-b which constitute the majority of the structure. Smaller flat structural stainless steel pieces may be utilized to form the smaller bottom portions 204a-b which are joined to the side portions 206a-b. Flat upper portions 208a-b complete the construction. This embodiment is constructed similarly as previous embodiments by utilization of inside and outside sheets of stainless steel connected between steam conduits 210 which open through the interior stainless steel walls for connection to nozzles 212. This embodiment, as with the other embodiments previously described, is preferably made up as two complete separate halves and then interconnected to form the divided housing as illustrated. In some cases, it will be desirable to divide the housing into two horizontal halves.

FIG. 13 illustrates another embodiment of the present vaporizing housing which is also constructed from flat structural members. The first half of the chambers are formed from flat structural members which form the sides 214a-222a. The other mirror side of the chamber is formed by the flat sides 214b-222b. While several embodiments for the shape of the compartmented chamber according to the invention have been illustrated, it will be understood that various other shapes for the cross section of the chamber may also be provided.

FIGS. 14-17 illustrate a second embodiment of a prewetting station according to the invention for use in the manner of the prewetting station 12 shown in FIG. 1. FIGS. 14 and 17 illustrate the prewetting station 230 which includes a generally rectangular chamber having parallel sides 232a and b. The chamber is open at both ends so that fowl F may be carried through by the overhead conveyor system of the invention. A pair of fluid conduits 234a-b are disposed along the sides of the housing and are connected thereto by brackets 236. Nozzles 238a-b are disposed along the length of the conduits 234a-b.

Fluid, preferably hot water, is fed to each of the conduits 234a-b via a supply pipe 240 which is connected to each of the conduits 234a-b by a rotary union 242. Water is fed via a pump 244 from an educter 246. Water is supplied via a line 248, with a throttle valve 250 being supplied therein. Steam is applied via line 252 through the throttle valve 254. The steam and water intermix to provide the desired temperature spray medium. A thermometer 256 records the temperature of the spray medium within pipe 240. A pressure gauge 258 is also provided to monitor the pressure within the pipe 240. Bypass valve 259 is provided to bypass the pump 244 if desired. The steam valve 254 may be controlled by the temperature sensor 184 disposed within the vaporizer housing if desired, to effect automatic operation of the system. Walls 260a-b are provided along the length of the prewetting chamber to maintain the heat about the fowl and to prevent splattering of the spray medium. A rectangular box 261 is connected beneath the walls 260a-b. Steam spray conduits 262a-b pass along the box 261 for admission of steam to riase the ambient temperature to cut down on evaporative cooling of the station.

Figure 15:
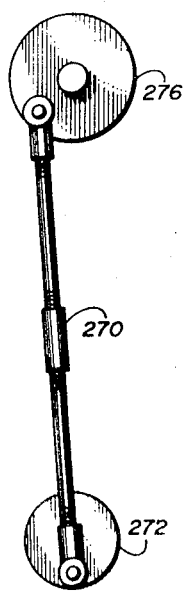
FIG. 15 is a view of the reciprocating circuitry for the prewetting station taken along the section lines 15—15 shown in FIG. 14.

The conduits 234a-b are mounted for pivotal or nutating movement and are oscillated by an off-center crank arrangement illustrated in FIG. 15. A shaft 270 is eccentrically mounted at its lower end to a crank member 272 which is driven by a suitable motor 274 (FIG. 14). Shaft 270 is mounted at its upper end eccentrically to the circular member 276, the center of which is attached to one end of the conduit 234a. A like motor and eccentric drive arrangement is connected to the opposite conduit 234b. The length of the shaft 270 may be varied to adjust the rate and arc of oscillation of the conduits. As shown in FIG. 17, the preferred embodiment, the conduits 234a-b are oscillated in opposite directions from one another so that one conduit is spraying the lower part of the fowl while the opposite conduit is spraying the upper part of the fowl. FIG. 16 illustrates the overlapping sprays of the system, which tends to evenly wet birds with high temperature and high pressure spray. Preferably, the conduits oscillate between 15 and 75 complete cycles per minute. In place of the electrically powered motors, the conduits may powered by motors driven by the high pressure water, steam, or air. It should be noted that the unit serves as an excellent shackle washer and sterilizer when empty shackles are passed through it and high temperature water is sprayed upon the shackles.

It will thus be seen that the present invention provides an improved apparatus and method for treating fowl and other animal carcasses prior to defeathering or further processing. For instance, the present system may advantageously be utilized in dehairing of hogs or other similar animals. The present system in some instances may also be found desirable to precook certain types of meat by increase of temperature and time duration within the vaporizer housing.

An important aspect of the present system is that it is capable of modular combinations with like systems. For instance, two like systems may be backed up to one another to provide a single elongated path of travel for the fowl. Alternatively, several systems may be placed parallel to one another to provide a series of U-shaped paths of travel for the fowl. Also, two systems may be connected at 90° to one another when space or operating conditions require.

Whereas the present invention has been described with respect to several specific embodiments thereof, it is to be understood that various changes and modifications will be suggested to one skilled in the art and it is intended to encompass these changes and modifications as fall within the true scope of the appended claims.

What is claimed is:

1. A vaporizing spray apparatus for treatment of animal carcasses comprising:
   an enclosed housing positioned to extend at a predetermined angle relative to the horizontal which is substantially less than 90°,
   an overhead conveyor supported and extending through said housing along a predetermined path along which the animal carcasses are carried,
   a supply of steam,
   means for adding water to the steam to supersaturate the steam,
   spray means supported on opposed wall portions of said housing for directing vaporized steam against the animal carcasses carried through the housing by the conveyor,
   means for selectively permitting and regulating the entry of ambient air into said housing to create an upward draft through said housing as required to regulate the housing internal temperature, and
   means for prewetting the animal carcasses before admittance into the said housing.

2. The apparatus of claim 1 wherein said means for prewetting comprises:
   a chamber through which the animals are passed, and
   a series of spray apertures directed parallel to the path of travel of the animals and directed along linear paths disposed at an angle to the horizontal.

3. The apparatus of claim 1 wherein each of said series of spray apertures are slanted opposite to one another on opposite sides of the path of travel of the animals.

4. The apparatus of claim 1 wherein said means comprises spray apertures which oscillate with respect to the animals.

* * * * *